United States Patent
Watanabe et al.

(10) Patent No.: US 8,548,676 B2
(45) Date of Patent: Oct. 1, 2013

(54) VEHICLE BRAKING DEVICE AND CONTROL DEVICE

(75) Inventors: Yoshinori Watanabe, Gotenba (JP); Hiroyuki Matsubayashi, Sunto-gun (JP); Hidehisa Kato, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/375,070

(22) PCT Filed: Oct. 28, 2010

(86) PCT No.: PCT/JP2010/069219
§ 371 (c)(1),
(2), (4) Date: Nov. 29, 2011

(87) PCT Pub. No.: WO2012/056550
PCT Pub. Date: May 3, 2012

(65) Prior Publication Data
US 2013/0211668 A1    Aug. 15, 2013

(51) Int. Cl.
*B60Q 1/44* (2006.01)

(52) U.S. Cl.
CPC ........................... *B60Q 1/44* (2013.01)
USPC ............................. 701/36; 701/70

(58) Field of Classification Search
CPC .......... B60Q 1/44; B60Q 1/445; B60Q 1/447
USPC ............... 340/467, 901; 303/125; 362/541; 701/29.1, 29.2, 29.7, 30.3, 30.5–30.7, 31.1, 701/36, 70
See application file for complete search history.

(56) References Cited

U.S. PATENT DOCUMENTS

| 7,098,799 B2 | 8/2006 | Imai et al. |
| 7,328,092 B2 * | 2/2008 | Eggert et al. ................. 701/31.7 |
| 2012/0185130 A1 * | 7/2012 | Ekchian et al. ................. 701/36 |

FOREIGN PATENT DOCUMENTS

| CN | 2352402 | 12/1999 |
| CN | 2564414 | 8/2003 |
| CN | 1532526 | 9/2004 |
| JP | A-7-65298 | 3/1995 |
| JP | A-7-195977 | 8/1995 |
| JP | A-2000-219128 | 8/2000 |
| JP | A-2003-252192 | 9/2003 |
| JP | A-2006-248294 | 9/2006 |
| JP | A-2010-30376 | 2/2010 |

OTHER PUBLICATIONS

STIC Fast an Focused Search on Jun. 10, 2013.*
International Search Report issued in International Patent Application No. PCT/JP2010/069219 dated Oct. 28, 2010 (with translation).

* cited by examiner

*Primary Examiner* — John Q Nguyen
*Assistant Examiner* — Michael Whalen
(74) *Attorney, Agent, or Firm* — Oliff & Berridge, PLC

(57) ABSTRACT

A vehicle braking device including a braking operation judging unit that judges that a braking operation is input when a fluid pressure detected by a pressure detecting sensor is not smaller than a threshold value set in advance in a process of a first mode in which it is judged that the device normally operates, and judges that the braking operation is input when judging that wheel deceleration of a tire detected by a wheel speed detecting sensor is larger than a threshold value in a process of a second mode in which it is judged the pressure detecting sensor does not normally detect a pressure or it is judged that a failure occurs in the fluid pressure, and a control unit puts a brake lamp arranged on a vehicle body into a lighting state from a non-lighting state when it is judged that the braking operation is input.

20 Claims, 5 Drawing Sheets

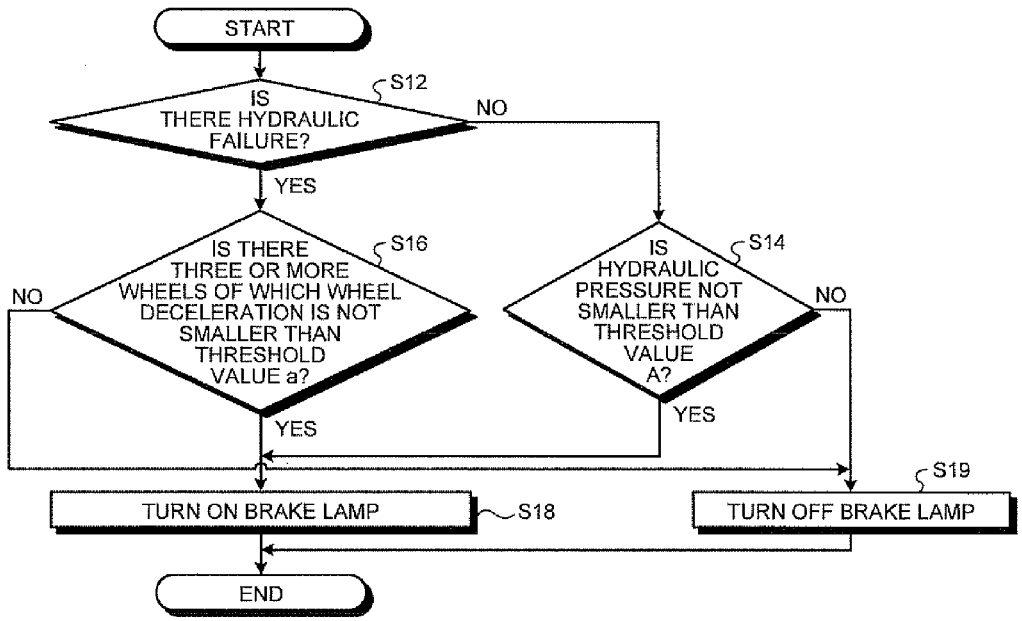
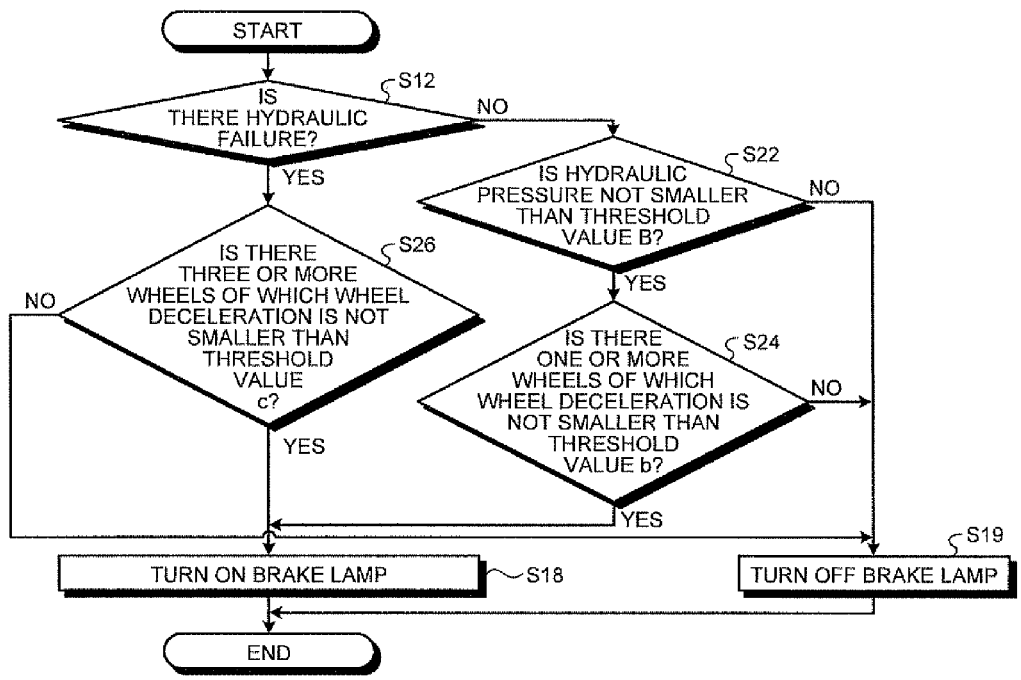

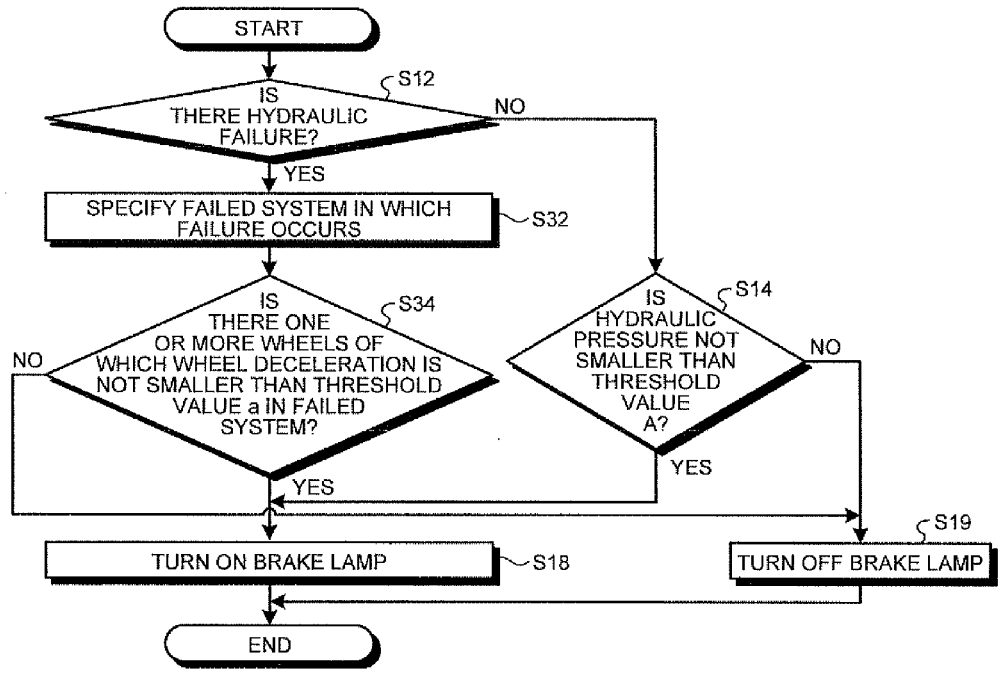
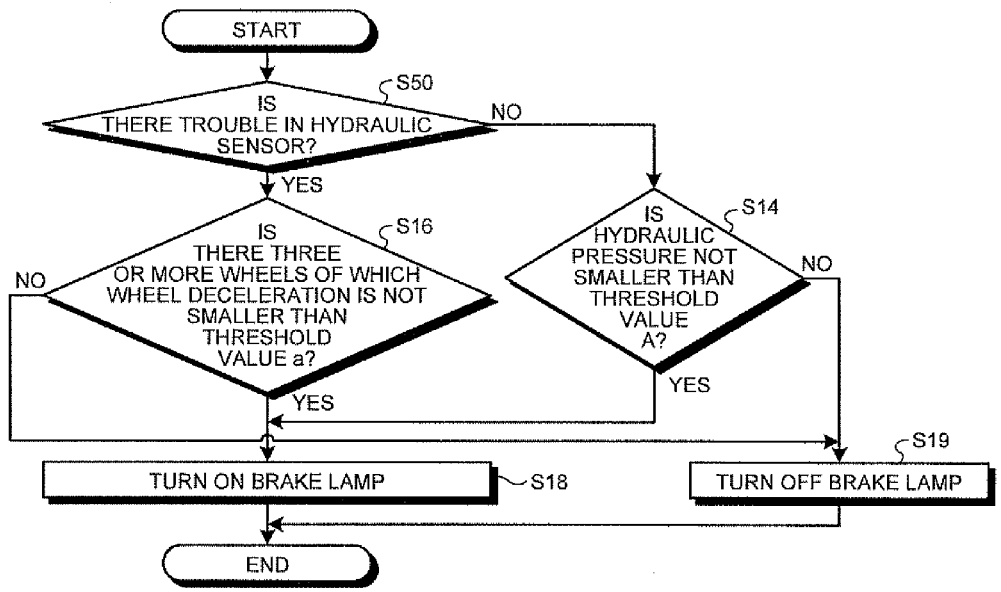

VEHICLE BRAKING DEVICE AND CONTROL DEVICE

FIELD

The present invention relates to a vehicle braking device and a control device for applying braking force to a vehicle and decelerating the same to stop.

BACKGROUND

A braking device such as a brake is provided on the vehicle such as an automobile for decelerating to stop during travel. The braking device decelerates the vehicle to stop by applying a load to rotating tires, an axle, and a driving mechanism in a direction to inhibit rotation.

Herein, the vehicle braking device operates by depression of a brake pedal. Also, the vehicle detects a depression amount and depression acceleration of the brake pedal and controls lighting of a brake lamp based on a detected amount as disclosed in the patent literature 1. Meanwhile, in the device disclosed in the patent literature 1, a lighting state of the brake lamp is controlled based on the depression acceleration.

Also, the patent literature 2 discloses the device to blink the brake lamp to increase/decrease brightness when a brake hydraulic pressure reaches a certain pressure and a pressure switch operates in order to indicate quick braking without delay. Also, the patent literature 3 discloses the device to turn on the stop lamp when deceleration by braking force of braking means becomes a predetermined value or larger.

CITATION LIST

Patent Literature

Patent Literature 1: Japanese Patent Application Laid-open No. 2006-248294
Patent Literature 2: Japanese Patent Application Laid-open No. H07-195977
Patent Literature 3: Japanese Patent Application Laid-open No. H07-65298

SUMMARY

Technical Problem

Herein, as disclosed in the patent literature 1, it is required that the device that detects brake input operation (that is to say, braking operation) by the depression amount (stroke amount) of the brake pedal is provided with a sensor that detects the depression amount of the brake pedal. Therefore, a detector for detecting the braking operation is provided. Also, when there is a breakdown in the sensor that detects the depression amount of the brake pedal, control based on the braking operation cannot be executed.

On the other hand, the patent literatures 2 and 3 can control the lighting of the brake lamp based on a detected value other than the depression amount of the brake pedal. However, the patent literatures 2 and 3 relate to methods of turning on the brake lamp at the time of emergency and the like to be executed together with lighting control of the brake lamp based on the depression amount of the brake pedal. Therefore, although the devices disclosed in the patent literatures 2 and 3 can turn on the brake lamp at the time of emergency and the like based on the detected value other than the depression amount of the brake pedal, they do not perform control for the braking operation other than the time of emergency.

The present invention is achieved in view of the above-description, and an object thereof is to provide a vehicle braking device and a control device capable of accurately detecting the braking operation with a simple device configuration.

Solution to Problem

In order to solve the above mentioned problem and achieve the object, a vehicle braking device according to the present invention that applies braking force to a tire rotatably arranged on a vehicle body, includes a fluid pressure braking unit that allows the braking force to act on the tire; a master cylinder that supplies a fluid pressure to the fluid pressure braking unit; a fluid pressure pipeline unit that transmits the fluid pressure supplied from the master cylinder to the fluid pressure braking unit; a pressure detecting sensor that detects a pressure of the fluid pressure supplied from the master cylinder to the fluid pressure braking unit; a wheel speed detecting sensor that detects a wheel speed of the tire; and a control device provided with a sensor trouble judging unit that judges whether the pressure detecting sensor normally detects the pressure, a braking operation judging unit that judges a state of braking operation, and a control unit that controls operation based on a judgment result of the braking operation judging unit, wherein the braking operation judging unit judges that the braking operation is input when the fluid pressure detected by the pressure detecting sensor is not smaller than a threshold value set in advance in a process of a first mode in which the sensor trouble judging unit judges that the pressure detecting sensor normally detects the pressure, and judges that the braking operation is input when judging that wheel deceleration of the tire detected by the wheel speed detecting sensor is larger than a threshold value in a process of a second mode in which the sensor trouble judging unit judges that the pressure detecting sensor does not normally detect the pressure, and the control unit puts a brake lamp arranged on the vehicle body into a lighting state from a non-lighting state when it is judged that the braking operation is input.

Here, in the vehicle braking device, it is preferable that the control device further includes a fluid pressure failure judging unit that judges whether there is a failure in the fluid pressure supplied from the master cylinder to the fluid pressure braking unit, and the braking operation judging unit executes the process of the first mode when the pressure detecting sensor normally detects the pressure and the fluid pressure failure does not occur, and executes the process of the second mode when it is judged that the pressure detecting sensor does not normally detect the pressure or when the fluid pressure failure judging unit judges that the failure occurs in the fluid pressure.

In order to solve the above mentioned problem and achieve the object, a vehicle braking device according to the present invention that applies braking force to a tire rotatably arranged on a vehicle body, includes a fluid pressure braking unit that allows the braking force to act on the tire; a master cylinder that supplies a fluid pressure to the fluid pressure braking unit; a fluid pressure pipeline unit that transmits the fluid pressure supplied from the master cylinder to the fluid pressure braking unit; a pressure detecting sensor that detects a pressure of the fluid pressure supplied from the master cylinder to the fluid pressure braking unit; a wheel speed detecting sensor that detects a wheel speed of the tire; and a control device provided with a fluid pressure failure judging unit that judges whether there is a failure in the fluid pressure supplied from the master cylinder to the fluid pressure braking unit, a braking operation judging unit that judges a state of braking operation, and a control unit that controls operation based on a judgment result of the braking operation judging unit, wherein the braking operation judging unit judges that the braking operation is input when the fluid pressure detected by the pressure detecting sensor is not smaller than a threshold value set in advance in a process of a first mode in which the fluid pressure failure judging unit judges that the failure does not occur in the fluid pressure, and judges that the braking operation is input when judging that wheel deceleration of the tire detected by the wheel speed detecting sensor is larger than a threshold value in a process of a second mode in which the fluid pressure failure judging unit judges that the failure occurs in the fluid pressure, and the control unit puts a brake lamp arranged on the vehicle body into a lighting state from a non-lighting state when it is judged that the braking operation is input.

Here, it is preferable that the fluid pressure pipeline unit includes at least two fluid pressure systems that transmit the fluid pressure from the master cylinder to the fluid pressure braking unit, and the braking operation judging unit puts the brake lamp into the lighting state from the non-lighting state when judging that the wheel deceleration of two or more of tires on which the braking force is allowed to act by the fluid pressure braking unit to which the fluid pressure is transmitted by the fluid pressure systems different from each other is larger than the threshold value in the process of the second mode in which it is judged that the fluid pressure failure occurs.

Here, it is preferable that the fluid pressure pipeline unit includes at least two fluid pressure systems that transmit the fluid pressure from the master cylinder to the fluid pressure braking unit, and the braking operation judging unit puts the brake lamp into the lighting state from the non-lighting state when judging that the wheel deceleration of the tire on which the braking force is allowed to act by the fluid pressure braking unit to which the fluid pressure is transmitted by a fluid pressure system in which the failure occurs in the fluid pressure is larger than the threshold value in the process of the second mode in which it is judged that the fluid pressure failure occurs.

Here, it is preferable that the braking operation judging unit puts the brake lamp into the lighting state from the non-lighting state when the fluid pressure detected by the pressure detecting sensor is not smaller than a first threshold value set in advance and when judging that the wheel deceleration of the tire is not smaller than a second threshold value in the process of the first mode, and puts the brake lamp into the lighting state from the non-lighting state when judging that the wheel deceleration of the tire is not smaller than a third threshold value which is the wheel deceleration larger than the second threshold value in the process of the second mode.

Here, it is preferable that the braking operation judging unit puts the brake lamp into the lighting state from the non-lighting state when judging that there are three or more tires of which wheel deceleration is larger than the threshold value in the process of the second mode.

In order to solve the above mentioned problem and achieve the object, a control device of a vehicle according to the present invention including a vehicle body, a brake lamp provided on the vehicle body, a tire rotatably arranged on the vehicle body, a fluid pressure braking unit that allows braking force to act on the tire, a master cylinder that supplies a fluid pressure to the fluid pressure braking unit, a fluid pressure pipeline unit that transmits the fluid pressure supplied from the master cylinder to the fluid pressure braking unit, a pressure detecting sensor that detects a pressure of the fluid pressure supplied from the master cylinder to the fluid pressure braking unit, and a wheel speed detecting sensor that detects a wheel speed of the tire, the control device that applies the braking force to the tire rotatably arranged on the vehicle body, includes a sensor trouble judging unit that judges whether the pressure detecting sensor normally detects the pressure; a braking operation judging unit that judges a state of braking operation; and a control unit that controls operation based on a judgment result of the braking operation judging unit, wherein the braking operation judging unit judges that the braking operation is input when the fluid pressure detected by the pressure detecting sensor is not smaller than a threshold value set in advance in a process of a first mode in which it is judged that the pressure detecting sensor normally detects the pressure, and judges that the braking operation is input when judging that wheel deceleration of the tire detected by the wheel speed detecting sensor is larger than a threshold value in a process of a second mode in which it is judged that the pressure detecting sensor does not normally detect the pressure, and the control unit puts the brake lamp into a lighting state from a non-lighting state when it is judged that the braking operation is input.

In order to solve the above mentioned problem and achieve the object, a control device of a vehicle according to the present invention including a vehicle body, a brake lamp provided on the vehicle body, a tire rotatably arranged on the vehicle body, a fluid pressure braking unit that allows braking force to act on the tire, a master cylinder that supplies a fluid pressure to the fluid pressure braking unit, a fluid pressure pipeline unit that transmits the fluid pressure supplied from the master cylinder to the fluid pressure braking unit, a pressure detecting sensor that detects a pressure of the fluid pressure supplied from the master cylinder to the fluid pressure braking unit, and a wheel speed detecting sensor that detects a wheel speed of the tire, the control device that applies the braking force to the tire rotatably arranged on the vehicle body, includes a fluid pressure failure judging unit that judges whether there is a failure in the fluid pressure supplied from the master cylinder to the fluid pressure braking unit; a braking operation judging unit that judges a state of braking operation; and a control unit that controls operation based on a judgment result of the braking operation judging unit, wherein the braking operation judging unit judges that the braking operation is input when the fluid pressure detected by the pressure detecting sensor is not smaller than a threshold value set in advance in a process of a first mode in which the fluid pressure failure judging unit judges that the failure does not occur in the fluid pressure, and judges that the braking operation is input when judging that wheel deceleration of the tire detected by the wheel speed detecting sensor is larger than a threshold value in a process of a second mode in which the fluid pressure failure judging unit judges that the failure occurs in the fluid pressure, and the control unit puts the brake lamp into a lighting state from a non-lighting state when it is judged that the braking operation is input.

Advantageous Effects of Invention

The vehicle braking device and the control device according to the present invention have an effect of accurately detecting the braking operation with the simple device configuration.

BRIEF DESCRIPTION OF DRAWINGS

FIG. 3 is a flow diagram illustrating an example of operation of the control device.

FIG. 4 is a flow diagram illustrating another example of the operation of the control device.

FIG. 5 is a flow diagram illustrating another example of the operation of the control device.

FIG. 6 is a flow diagram illustrating another example of the operation of the control device.

DESCRIPTION OF EMBODIMENTS

The present invention is hereinafter described in detail with reference to the drawings. Meanwhile, the present invention is not limited by a following mode for carrying out the invention (hereinafter, referred to as an embodiment). Also, a component that can be easily conceived of by one skilled in the art, and a substantially identical component, or a so-called equivalent are included in the components of the following embodiment. Further, the components disclosed in the following embodiment can be appropriately combined. The embodiment of a vehicle according to the present invention is hereinafter described in detail with reference to the drawings. Meanwhile, the invention is not limited by this embodiment.

Embodiment

Figure 1:
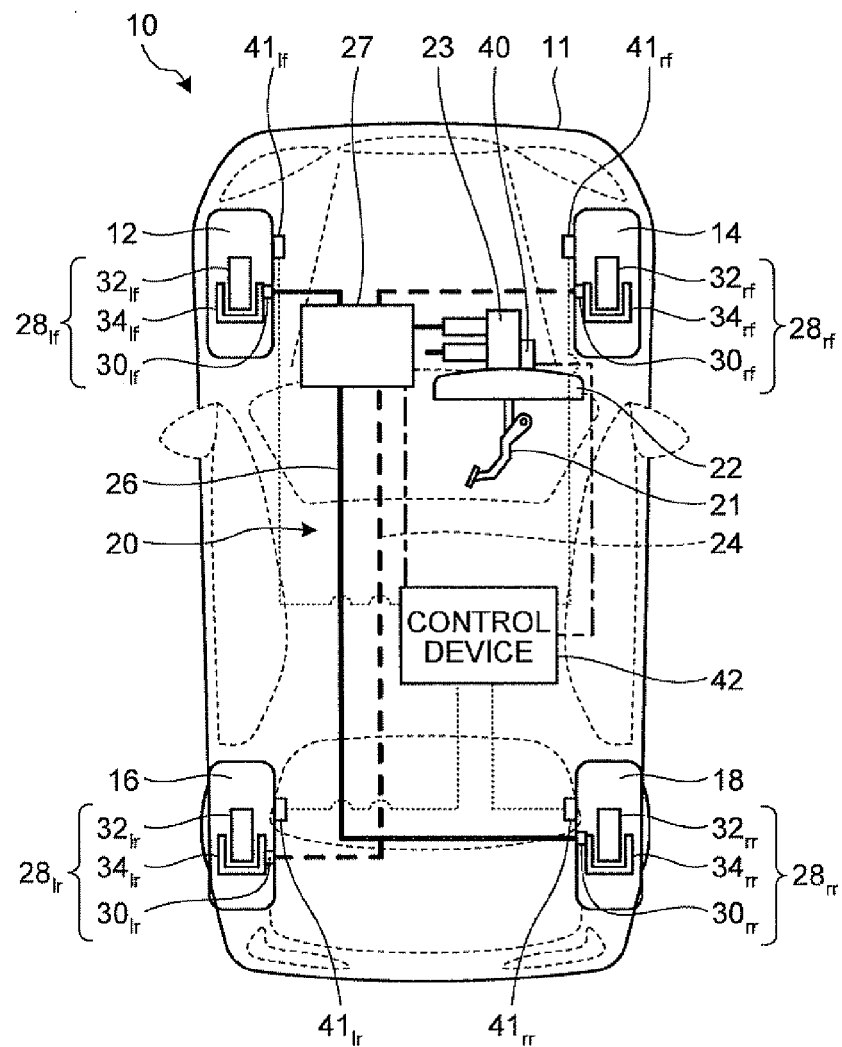
FIG. 1 is a schematic diagram illustrating a schematic configuration of a vehicle including a vehicle braking device.

FIG. 1 is a schematic diagram illustrating a schematic configuration of the vehicle including a vehicle braking device. As illustrated in FIG. 1, a vehicle 10 includes a vehicle body 11, a left front tire 12, a right front tire 14, a left rear tire 16, a right rear tire 18, a braking device 20, a hydraulic sensor 40, a control device 42, and wheel speed sensors $41_{lf}$, $41_{rf}$, $41_{lr}$, and $41_{rr}$. Meanwhile, although not illustrated, the vehicle 10 is provided with various configurations required as the vehicle such as a driving source, a power transmitting unit, an operating unit, and a seat in addition to the above-described configurations.

The vehicle body 11 is a casing of the vehicle 10, or a so-called body. The driving source, the power transmitting unit, the operating unit, the seat and the like are provided in the vehicle body 11.

The left front tire 12, the right front tire 14, the left rear tire 16, and the right rear tire 18 are arranged on four sides of the vehicle body 11 so as to come into contact with a road surface. The left front tire 12, the right front tire 14, the left rear tire 16, and the right rear tire 18 are rotated by the driving source and the power transmitting unit, thereby transmitting driving force to the road surface to move the vehicle body 11 relative to the road surface.

The braking device 20 includes a brake pedal 21 operated by a driver, a servo brake system (brake booster) 22, which doubles pedal force input to the brake pedal 21, a master cylinder 23, which converts the pedal force doubled by the servo brake system 22 to a fluid pressure (hydraulic pressure) of brake fluid, first and second hydraulic pipelines 24 and 26, which circulate the hydraulic pressure supplied from the master cylinder 23, a brake actuator 27 arranged on pipeline routes of the first and second hydraulic pipelines 24 and 26, and hydraulic braking units $28_{lf}$, $28_{rf}$, $28_{lr}$, and $28_{rr}$ each of which is arranged so as to correspond to each tire for generating braking force by the hydraulic pressure supplied from the first and second hydraulic pipelines 24 and 26. Meanwhile, the first hydraulic pipeline 24 is connected to the hydraulic braking units $28_{rf}$ and $28_{lr}$. Also, the second hydraulic pipeline 26 is connected to the hydraulic braking units $28_{lf}$ and $28_{rr}$. Also, the braking device 20 includes a partial function of the hydraulic sensor 40 and a partial function of the control device 42.

The brake pedal 21 is an operation input mechanism operated by the driver, which moves in a depressing direction by depression by the driver. The servo brake system 22 is connected to the brake pedal 21, and when the brake pedal 21 is depressed to move, this doubles the pedal force input to the brake pedal 21 to transmit to the master cylinder 23. When the force is transmitted from the servo brake system 22, the master cylinder 23 supplies the fluid pressure corresponding to transmitted force to the first and second hydraulic pipelines 24 and 26. Herein, the master cylinder 23 includes a link mechanism, which transmits the force transmitted from the servo brake system 22, a first cylinder, which supplies the hydraulic pressure to the first hydraulic pipeline 24 according to the force transmitted from the link mechanism, and a second cylinder, which supplies the hydraulic pressure to the second hydraulic pipeline 26 according to the force transmitted from the link mechanism. Meanwhile, the first and second cylinders are filled with hydraulic oil, and when the force is transmitted from the link mechanism and an internal hydraulic pressure increases, the first and second cylinders supply the hydraulic pressure to each of hydraulic pipelines. Also, in a state in which the pedal force is not applied to the brake pedal 21, the master cylinder 23 restores the hydraulic pressure to a reference hydraulic pressure to return the brake pedal 21 to a reference position.

Herein, when a crew depresses the brake pedal 21, operating force (pedal force) is transmitted to the servo brake system 22. According to this, force obtained by doubling the operating force is transmitted to the master cylinder 23. When the force obtained by doubling the operating force is transmitted from the servo brake system 22 to the master cylinder 23, the force is transmitted to the first and second cylinders by the link mechanism. Meanwhile, the link mechanism transmits the force to the first and second cylinders in series or in parallel. According to this, the force is transmitted to the first and second cylinders cooperatively. When the force obtained by doubling the operating force is transmitted to the first and second cylinders, the volume in the cylinders decreases and the hydraulic pressure in the cylinders increases. According to this, the hydraulic pressure of the hydraulic oil increases in the first cylinder and this discharges the hydraulic oil to the first hydraulic pipeline 24 at a constant hydraulic pressure. Also, the hydraulic pressure of the hydraulic oil increases in the second cylinder also and this discharges the hydraulic oil to the second hydraulic pipeline 26 at a constant hydraulic pressure.

The brake actuator 27 is arranged on the pipeline routes of the first and second hydraulic pipelines 24 and 26 to adjust the hydraulic pressure supplied from the master cylinder 23 to the hydraulic braking units $28_{lf}$, $28_{rf}$, $28_{lr}$, and $28_{rr}$. Specifically, the brake actuator 27 is brake fluid pressure adjusting means to adjust a master cylinder pressure supplied from the master cylinder 23 directly or for each wheel. Meanwhile, the brake actuator 27 is composed of an increasing/decreasing pressure control valve and the like for increasing/decreasing the brake fluid pressure for each of an oil reservoir, an oil pump, and the first and second hydraulic pipelines 24 and 26, for example, and further for the hydraulic pipeline corresponding to each wheel. Also, operation of the brake actuator 27 is controlled by the control device 42 to be described later.

The hydraulic braking unit $28_{lf}$ applies the braking force to the left front tire 12, the hydraulic braking unit $28_{rf}$ applies the braking force to the right front tire 14, the hydraulic braking unit $28_{lr}$ applies the braking force to the left rear tire 16, and the hydraulic braking unit $28_{rf}$ applies the braking force to the right rear tire 18. The hydraulic braking unit $28_{lf}$ includes a wheel cylinder $30_{lf}$ to which the hydraulic pressure supplied from the master cylinder 23 through the brake actuator 27 (adjusted by the brake actuator 27) is supplied by the second hydraulic pipeline 26, a brake rotor $32_{lf}$, which rotates together with the wheel (left front tire 12), and a brake pad $34_{lf}$ supported by the vehicle body 11 so as not to rotate, of which position is changed by the wheel cylinder $30_{lf}$ to come into contact with the brake rotor $32_{lf}$ at the time of braking. The hydraulic braking unit $28_{lf}$ has the configuration as described above, and when a higher hydraulic pressure (hydraulic pressure at the time of braking) is supplied from the master cylinder 23 through the brake actuator 27, the wheel cylinder $30_{lf}$ moves the brake pad $34_{lf}$ in a direction to press the same to the brake rotor $32_{lf}$. According to this, the brake pad $34_{lf}$ comes into contact with the brake rotor $32_{lf}$ to apply the force in a direction to stop the rotation to the brake rotor $32_{lf}$. The hydraulic braking unit $28_{lf}$ applies the braking force to the tire arranged so as to be opposed to the same by the hydraulic pressure supplied from the master cylinder 23 through the brake actuator 27 in this manner.

Next, each of the hydraulic braking units $28_{rf}$, $28_{lr}$, and $28_{rr}$ has the configuration basically similar to that of the hydraulic braking unit $28_{lf}$ except that an arrangement position thereof (correspondingly arranged tire) is different. In the hydraulic braking unit $28_{rf}$, a position of a wheel cylinder $30_{rf}$ is changed by the hydraulic pressure supplied from the first hydraulic pipeline 24 (that is to say, the hydraulic pressure supplied from the master cylinder 23 through the brake actuator 27 by the first hydraulic pipeline 24), and at the time of braking, the high hydraulic pressure is supplied from the first hydraulic pipeline 24 to the wheel cylinder $30_{rf}$ to bring a brake pad $34_{rf}$ into contact with a brake rotor $32_{rf}$, thereby applying the braking force to the right front tire 14. In the hydraulic braking unit $28_{lr}$, a position of a wheel cylinder $30_{lr}$ is changed by the hydraulic pressure supplied from the first hydraulic pipeline 24, and at the time of braking, the high hydraulic pressure is supplied from the first hydraulic pipeline 24 to the wheel cylinder $30_{lr}$ to bring a brake pad $34_{lr}$ into contact with a brake rotor $32_{lr}$, thereby applying the braking force to the left rear tire 16. In the hydraulic braking unit $28_{rr}$, a position of a wheel cylinder $30_{rr}$ is changed by the hydraulic pressure supplied from the second hydraulic pipeline 26, and at the time of braking, the high hydraulic pressure is supplied from the second hydraulic pipeline 26 to the wheel cylinder $30_{rr}$ to bring a brake pad $34_{rr}$ into contact with a brake rotor $32_{rr}$, thereby applying the braking force to the right rear tire 18.

The braking device 20 has the configuration as described above, and when the crew depresses the brake pedal 21, the hydraulic pressure is discharged from the master cylinder 23 to the first and second hydraulic pipelines 24 and 26. According to this, the hydraulic pressure discharged from a first fluid pressure chamber of the master cylinder 23 is supplied to the hydraulic braking units $28_{rf}$ and $28_{lr}$ through the first hydraulic pipeline 24. The hydraulic pressure discharged from a second fluid pressure chamber of the master cylinder 23 is supplied to the hydraulic braking units $28_{lf}$ and $28_{rr}$ through the second hydraulic pipeline 26. By the discharge of the hydraulic pressure from the master cylinder 23 to each hydraulic braking unit in this manner, the brake pad comes into contact with the brake rotor of each hydraulic braking unit to apply the braking force to the tire. According to this, the vehicle 10 is decelerated to be stopped.

The hydraulic sensor 40 is a hydraulic pressure detecting element, which detects the hydraulic pressure of the master cylinder 23. The hydraulic sensor 40 detects the hydraulic pressure of the hydraulic oil supplied from the master cylinder 23 to the first hydraulic pipeline 24 and/or the second hydraulic pipeline 26 and sends a detected result to the control device 42.

The wheel speed sensors $41_{lf}$, $41_{rf}$, $41_{lr}$, and $41_{rr}$ are provided on four wheels of the vehicle, respectively, for detecting rotational speeds of the wheels to output the detected rotational speeds of the wheels to the control device 42. Meanwhile, the wheel speed sensor $41_{lf}$ detects the rotational speed of the left front tire 12, the wheel speed sensor $41_{rf}$ detects the rotational speed of the right front tire 14, the wheel speed sensor $41_{lr}$ detects the rotational speed of the left rear tire 16, and the wheel speed sensor $41_{rr}$ detects the rotational speed of the right rear tire 18.

Figure 2:
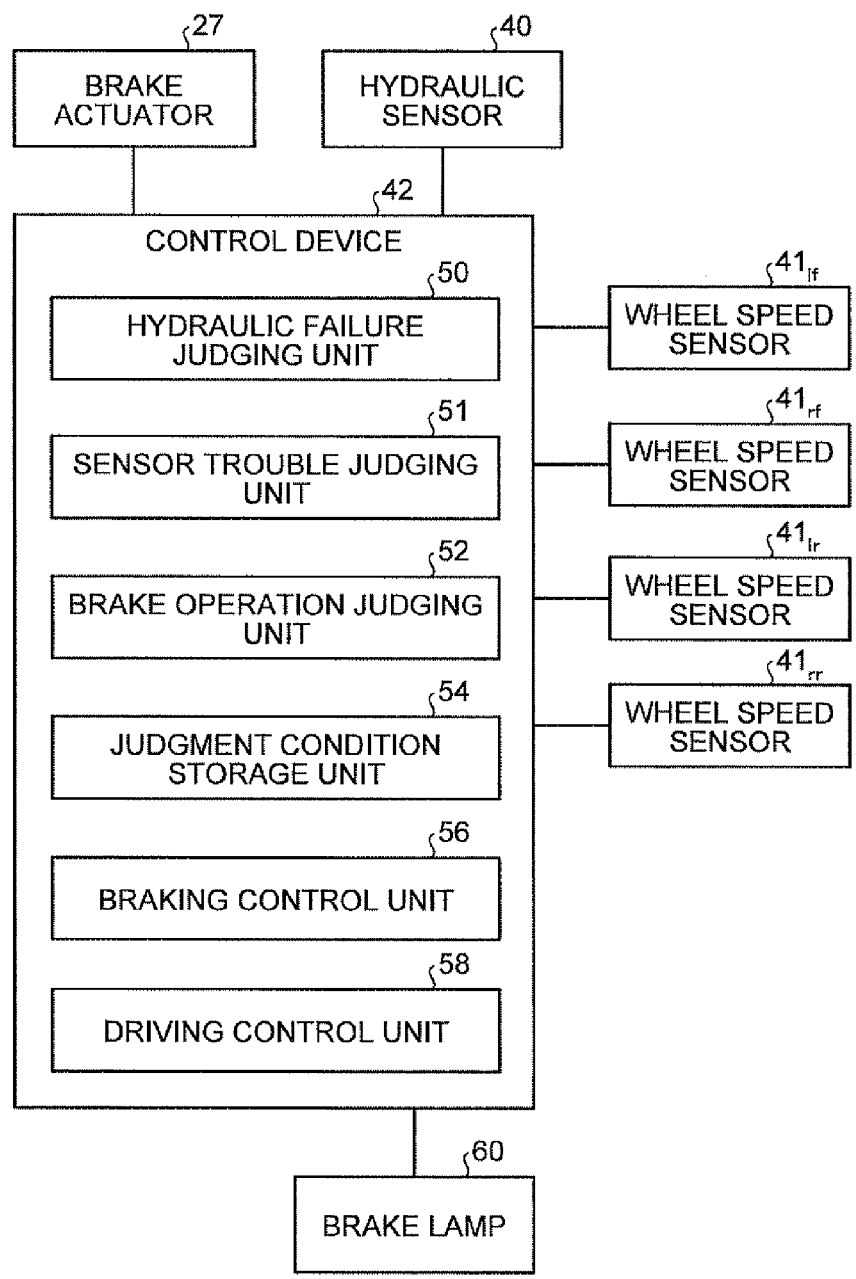
FIG. 2 is a block diagram illustrating a schematic configuration of a control device.

Next, the control device 42 controls operation of each unit of the vehicle 10 based on the detected result of the sensor supplied from each unit, input operation, a set condition and the like. Herein, FIG. 2 is a block diagram illustrating a schematic configuration of the control device. The control device 42 includes a hydraulic failure judging unit 50, a sensor trouble judging unit 51, a brake operation judging unit 52, a judgment condition storage unit 54, a braking control unit 56, and a driving control unit 58, as illustrated in FIG. 2. Meanwhile, the control device 42 is provided with various functions used as an electronic control unit (ECU) of the vehicle 10 in addition to these units.

Also, the control device 42 is connected to the brake actuator 27, the hydraulic sensor 40, the wheel speed sensors $41_{lf}$, $41_{rf}$, $41_{lr}$, and $41_{rr}$, and a brake lamp 60. Herein, the brake lamp 60 is a light emitting device arranged on a rear portion of the vehicle body 11. The brake lamp 60 can allow the vehicle behind the same to recognize whether braking operation is executed by switching lighting and non-lighting of the same. Also, the control device 42 is connected to various control targets and detecting elements in addition to the brake actuator 27, the hydraulic sensor 40, and the brake lamp 60. Hereinafter, each unit of the control device 42 is described.

The hydraulic failure judging unit 50 judges whether a failure occurs in the hydraulic pressure supplied from the master cylinder 23 to the hydraulic braking units $28_{rf}$, $28_{rf}$, $28_{lr}$, and $28_{rr}$ does not occur, that is to say, whether the hydraulic oil normally flows through the first and second hydraulic pipelines 24 and 26. The hydraulic failure judging unit 50 judges whether a hydraulic failure (failure of the hydraulic pressure) occurs by using various detected values supplied to the control device 42. The hydraulic failure judging unit 50 judges whether the hydraulic failure occurs based on the hydraulic pressure detected by the hydraulic sensor 40 and the detected values of the wheel speed sensors $41_{lf}$, $41_{rf}$, $41_{lr}$, and $41_{rr}$ (hereinafter, the four wheel speed sensors are also collectively referred to as "each wheel speed sensors 41") at the time of braking, for example. Specifically, by using the hydraulic pressure supplied from the master cylinder 23 and balance of deceleration calculated from the wheel speed detected by the each wheel speed sensor 41, it is judged that the hydraulic failure occurs when the wheel is not decelerated with estimated deceleration. The hydraulic failure judging unit 50 judges that the hydraulic pipeline to which the tire of which deceleration is small (which is not decelerated) is connected is a failed hydraulic pipeline. Also, as a method of judging executed by the hydraulic failure judging unit 50, it is also possible to provide a hydraulic failure detecting valve on the first and second hydraulic pipelines 24 and 26 to judge whether the hydraulic failure occurs based on a detected result of the hydraulic failure detecting valve.

The sensor trouble judging unit 51 judges whether the hydraulic sensor 40 normally operates, that is to say, whether this normally detects the master cylinder pressure. The sensor trouble judging unit 51 judges whether the hydraulic sensor 40 normally operates or trouble occurs by using the various detected values supplied to the control device 42. For example, by using the detected value of the hydraulic sensor 40 and the wheel deceleration calculated from the wheel speed detected by the each wheel speed sensor 41, the sensor trouble judging unit 51 judges that the hydraulic sensor 40 does not normally operate, that is to say, the trouble occurs in the hydraulic sensor 40 in a case in which difference between the wheel deceleration estimated from the detected value of the hydraulic sensor 40 and the wheel deceleration calculated from the wheel speed detected by the each wheel speed sensor 41 is not smaller than a certain value.

The brake operation judging unit 52 judges whether it is in a state in which the braking operation is input or it is in a state in which the braking operation is not input. Herein, the brake operation judging unit 52 judges whether it is in a state in which the braking operation is input (a state in which the brake operation is executed) or it is in a state in which the braking operation is not input (a state in which the brake operation is not executed) based on the detected result detected by the hydraulic sensor 40 and a calculated result of the wheel deceleration of each tire calculated by the each wheel speed sensor 41. Specifically, the brake operation judging unit 52 determines a threshold value based on judgment results of the hydraulic failure judging unit 50 and the sensor trouble judging unit 51 and various pieces of information stored in the judgment condition storage unit 54 and compares the determined threshold value with at least one of the detected result detected by the hydraulic sensor 40 and the calculated result of the wheel deceleration of each tire calculated by the each wheel speed sensor 41 to judge presence of input of the braking operation. A judging process by the brake operation judging unit 52 is described later.

The judgment condition storage unit 54 stores a criterion for judgment whether the braking operation is input by the brake operation judging unit 52, a condition of using the criterion and the like. Herein, in this embodiment, the criteria for judgment include a criterion value for the hydraulic pressure detected by the hydraulic sensor 40, that is to say, the criterion value of the master cylinder pressure, a criterion value for the wheel deceleration calculated from the value detected by the each wheel speed sensor 41 and the like. Also, the various conditions include a selected judgment mode, the judgment result by the hydraulic failure judging unit 50, and the judgment result by the sensor trouble judging unit 51. Meanwhile, the judgment mode is the method of judging used when judging the input of the braking operation and a plurality of methods can be selected.

The braking control unit 56 controls the operation of the brake actuator 27 based on the judgment result of the brake operation judging unit 52 and the operation input by an operator. Also, the braking control unit 56 switches ON/OFF of a stop switch signal based on the judgment result of the brake operation judging unit 52 to determine to turn on the brake lamp 60 and a control reference state of the various pieces of braking operation. Herein, the stop switch signal is ON in a state in which braking control is executed (a state in which the braking force is allowed to act) and OFF when the braking control is not executed (a state in which the braking force is not allowed to act).

The driving control unit 58 controls operation of a drive unit such as an engine, a transmitting element, and a steering element based on a vehicle state amount and the operation input by the operator.

Next, controlling operation of the control device 42 is described in further detail with reference to FIG. 3. Herein, FIG. 3 is a flow diagram illustrating an example of the operation of the control device. Meanwhile, the control device 42 can execute process illustrated in FIG. 3 by performing the process by each unit, mainly by the brake operation judging unit 52 based on the information supplied from a sensor of the external device and the like. The process illustrated in FIG. 3 is the process to change the condition of judging whether the braking operation is input based on the judgment result of the hydraulic failure judging unit 50.

First, the control device 42 judges whether there is the hydraulic failure by the hydraulic failure judging unit 50 as a step S12. When the control device 42 judges that there is no hydraulic failure (No) at the step S12, this judges whether the hydraulic pressure detected by the hydraulic sensor 40 is not smaller than a threshold value A as a step S14. When the control device 42 judges that the hydraulic pressure is not smaller than the threshold value A (Yes) at the step S14, this shifts to a step S18. Also, when the control device 42 judges that the hydraulic pressure is smaller than the threshold value A (No) at the step S14, this shifts to a step S19. Meanwhile, in this embodiment, the process at the step S14 becomes the process of a first mode.

Also, when the control device 42 judges that there is the hydraulic failure (Yes) at the step S12, this judges whether there are three or more wheels of which wheel deceleration is not smaller than a threshold value a as a step S16. That is to say, when the control device 42 judges that there is the hydraulic failure (Yes) at the step S12, this judges that the detected value by the hydraulic sensor 40 is in a state in which a normal detected result cannot be calculated (a state in which the hydraulic pressure detected by the hydraulic sensor 40 is not properly supplied to each hydraulic braking unit) and judges the presence of the braking operation based on the wheel speed detected by the each wheel speed sensor 41. Specifically, the control device 42 calculates the wheel deceleration of each tire (each wheel) from the wheel speed detected by the each wheel speed sensor 41 by the brake operation judging unit 52 as the step S16 and judges whether there are three or more tires of which wheel deceleration is not smaller than the threshold value a out of the calculated wheel deceleration of each tire. That is to say, it is judged whether the wheel deceleration of three or more tires out of the four tires is not smaller than the threshold value a.

When the control device 42 judges that there are three or more tires of which wheel deceleration is not smaller than the threshold value a (Yes) at the step S16, this shifts to the step S18. Also, when the control device 42 judges that the number of tires of which wheel deceleration is not smaller than the threshold value a is smaller than three (No) at the step S16, that is to say, that the number of tires of which wheel deceleration is not smaller than the threshold value a is not larger than two, this shifts to the step S19. Meanwhile, in this embodiment, the process at the step S16 becomes the process of a second mode.

When the control device 42 judges that the hydraulic pressure is not smaller than the threshold value A at the step S14 or that there are three or more tires of which wheel deceleration is not smaller than the threshold value a at the step S16, this judges that the braking operation is input and turns on the brake lamp 60 as the step S18. Also, when the control device 42 judges that the braking operation is input, this starts the braking control by the braking control unit 56. Thereafter, the control device 42 finishes this process.

Also, when the control device 42 judges that the hydraulic pressure is smaller than the threshold value A at the step S14 or that the number of tires of which wheel deceleration is not smaller than the threshold value a is smaller than three at the step S16, this judges that the braking operation is not input and put the brake lamp 60 into a non-lighting state as the step S19. Also, when the control device 42 judges that the braking operation is not input, this finishes the braking control by the braking control unit 56. Thereafter, the control device 42 finishes this process.

Meanwhile, the control device 42 performs the process at the step S18 or the step S19 and when this finishes this process, this performs again the process in the flow diagram illustrated in FIG. 3 from the step S12. That is to say, the control device 42 repeatedly executes the process illustrated in FIG. 3.

Also, when the control device 42 judges that the braking operation is input and turns on the brake lamp 60 at the step S18, if the brake lamp 60 is in a lighting state immediately before (that is to say, the braking control is executed), this maintains the lighting state of the brake lamp 60, and if the brake lamp 60 is not in the lighting state immediately before (that is to say, the braking control is not executed), this turns on the brake lamp 60. Also, when the control device 42 judges that the braking operation is not input and puts the brake lamp 60 into the non-lighting state at the step S19, if the brake lamp 60 is in the lighting state immediately before (that is to say, the braking control is executed), this switches from the lighting state of the brake lamp 60 to the non-lighting state, and if the brake lamp 60 is not in the lighting state immediately before (that is to say, the braking control is not executed), this maintains the non-lighting state of the brake lamp 60.

In this manner, the control device 42 (and the braking device 20 and the vehicle 10 provided with the same) judges whether the braking operation is input based on the hydraulic pressure of the master cylinder 23 detected by the hydraulic sensor 40 as the process of the first mode when the hydraulic failure does not occur, and by turning on the brake lamp 60 when the hydraulic pressure is not smaller than the threshold value, this can detect the presence of the input of the braking operation without detecting the depression amount of the brake pedal 21. According to this, the presence of the input of the braking operation can be detected only by using the hydraulic sensor 40 used for another application without providing a sensor for detecting the depression amount of the brake pedal 21, so that the device configuration can be made simple. Also, by detecting the hydraulic pressure of the master cylinder 23, the hydraulic pressure generated by the depression of the brake pedal 21 can be detected.

The control device 42 detects the presence of the hydraulic failure, and when the hydraulic failure occurs, this can detect the presence of the input of the braking operation based on the wheel deceleration as the process of the second mode. According to this, the control device 42 can detect the presence of the input of the braking operation even when it is not possible to supply the normal hydraulic pressure to each hydraulic braking unit by the hydraulic sensor 40. According to this, it is possible to appropriately turn on the brake lamp 60 when inputting the braking operation even when the hydraulic failure occurs, that is to say, when a breakdown occurs. Also, the control device 42 can more appropriately judge the braking operation by judging the presence of the input of the braking operation based on the hydraulic pressure of the master cylinder 23 when the hydraulic failure does not occur.

Also, the control device 42 performs a judging process in which at least the detected value of the hydraulic pressure is the criterion for the judgment as the first mode when the hydraulic failure does not occur and performs the judging process in which at least the wheel deceleration is the criterion for the judgment as the second mode when the hydraulic failure occurs, thereby appropriately turning on the brake lamp 60 at the time of normal usage and when the trouble occurs.

The control device 42 can appropriately detect the presence of the input of the braking operation even when the first hydraulic pipeline 24 fails or when the second hydraulic pipeline 26 fails by judging based on the criterion whether there are three or more tires of which wheel deceleration is not smaller than the threshold value a, that is to say, judging based on the criterion whether the wheel deceleration of the three tires (wheels) out of the four tires (wheels) is not smaller than the threshold value a. In this manner, it is possible to appropriately detect the presence of the input of the braking operation regardless of a hydraulic system in which the hydraulic failure occurs, so that it is possible to appropriately judge the input of the braking operation when the hydraulic failure occurs. Herein, this embodiment is composed of two hydraulic systems in which the first hydraulic pipeline 24 is the hydraulic system to supply the hydraulic pressure from the master cylinder 23 to the hydraulic braking unit $28_{rf}$ of the right front tire 14 and the hydraulic braking unit $28_{lr}$ of the left rear tire 16, and the second hydraulic pipeline 26 is the hydraulic system to supply the hydraulic pressure from the master cylinder 23 to the hydraulic braking unit $28_{lf}$ of the left front tire 12 and the hydraulic braking unit $28_{rr}$ of the right rear tire 18. According to this, by making the fact that there are three or more tires of which wheel deceleration is not smaller than the threshold value a out of the four tires the threshold value, it is possible to judge that the braking operation is input when the wheel deceleration of both of the tire connected to the hydraulic system in which the hydraulic failure occurs and the tire connected to the hydraulic system in which the hydraulic failure does not occur is not smaller than the threshold value. According to this, it is possible to detect a state in which the wheel deceleration of the tire connected to the hydraulic system in which the hydraulic failure occurs with smaller wheel deceleration also is larger than the threshold value as the state in which the braking operation is input. According to this, it is possible to judge whether the braking operation is input based on the wheel deceleration of the tire connected to the hydraulic system in which the hydraulic failure occurs of which wheel deceleration is the closest to the deceleration of the vehicle body.

The control device 42 (and the braking device 20 and the vehicle 10 provided with the same) is capable of performing the above-described process by using the detected values of the hydraulic sensor 40 and the each wheel speed sensor 41 required for the vehicle and generally provided for another application. According to this, the sensor, which detects the depression amount of the brake pedal 21, can be omitted without newly preventing another sensor, so that the device configuration can be made simple.

Meanwhile, in the process illustrated in FIG. 3, although it is judged based on the criterion of judging a switch from the lighting state to the non-lighting state of the brake lamp 60 (that is to say, the switch from a state in which the braking operation is not input to a state in which this is input) and the criterion of judging the switch from the non-lighting state to the lighting state of the brake lamp 60 (that is to say, the switch from the state in which the braking operation is input to the state in which this is not input) by using the identical threshold value a and the identical threshold value A, it is possible to judge with other threshold values. That is to say, the process to switch from the lighting state to the non-lighting state of the brake lamp 60 and the process to switch from the non-lighting state to the lighting state of the brake lamp 60 may be performed as different pieces of control. That is to say, the control device 42 may execute different judging operation in the non-lighting of the brake lamp 60 (a state in which the braking control is not executed) and the lighting state of the brake lamp 60 (a state in which the braking control is executed). Meanwhile, in a case of using the process of the flow diagram illustrated in FIG. 3 as the control in the non-lighting state of the brake lamp 60, if it is judged No at the steps S14 and S16, the process may be finished directly.

Meanwhile, although the each wheel speed sensors 41 are provided so as to correspond to all the tires for more appropriate control in this embodiment, there is no limitation. It is possible to provide only the required number of wheel speed sensors on the vehicle 10 and the braking device 20, or it is possible to use only the required number of wheel speed sensors as a control target. That is to say, the above-described process can be executed by using only optional three wheel speed sensors in this embodiment.

Next, another example of the controlling operation by the control device 42 is described with reference to FIG. 4. Herein, FIG. 4 is a flow diagram illustrating an example of the operation of the control device. A process illustrated in FIG. 4 is the process to change the condition of judging whether the braking operation is input based on the judgment result of the hydraulic failure judging unit 50.

First, the control device 42 judges whether there is the hydraulic failure by the hydraulic failure judging unit 50 as the step S12. When the control device 42 judges that there is no hydraulic failure (No) at the step S12, this judges whether the hydraulic pressure detected by the hydraulic sensor 40 is not smaller than a threshold value B as a step S22. When the control device 42 judges that the hydraulic pressure is not smaller than the threshold value B (Yes) at the step S22, this shifts to a step S24. Also, when the control device 42 judges that the hydraulic pressure is smaller than the threshold value A (No) at the step S22, this shifts to the step S19.

When the control device 42 judges that the hydraulic pressure is not smaller than the threshold value B at the step S22, this calculates the wheel deceleration of each tire (each wheel) from the wheel speed detected by the each wheel speed sensor 41 to judge whether there is one or more tires of which wheel deceleration is not smaller than a threshold value b out of the calculated wheel deceleration of each tire by the brake operation judging unit 52 as the step S24. When the control device 42 judges that there is one or more tires of which wheel deceleration is not smaller than the threshold value b (Yes) at the step S24, this shifts to the step S18. Also, when the control device 42 judges that the number of tires of which wheel deceleration is not smaller than the threshold value b is smaller than one (No) at the step S24, that is to say, that the wheel deceleration of all the tires is smaller than the threshold value b, this shifts to the step S19. Meanwhile, the process at the steps S22 and S24 becomes the process of the first mode in this embodiment.

Also, when the control device 42 judges that there is the hydraulic failure (Yes) at the step S12, this judges whether there are three or more wheels of which wheel deceleration is not smaller than a threshold value c as a step S26. Herein, the threshold value c is the value of the wheel deceleration larger than the threshold value b.

When the control device 42 judges that there are three or more tires of which wheel deceleration is not smaller than the threshold value c (Yes) at the step S26, this shifts to the step S18. Also, when the control device 42 judges that the number of tires of which wheel deceleration is not smaller than the threshold value c is smaller than three (No) at the step S26, that is to say, that the number of tires of which wheel deceleration is not smaller than the threshold value c is not larger than two, this shifts to the step S19. Meanwhile, in this embodiment, the process at the step S26 becomes the process of the second mode.

When the control device 42 judges that the hydraulic pressure is not smaller than the threshold value B at the step S22 and that there is one or more tires of which wheel deceleration is not smaller than the threshold value b at the step S24 or that there are three or more tires of which wheel deceleration is not smaller than the threshold value c at the step S26, this judges that the braking operation is input and turns on the brake lamp 60 as the step S18. Also, when the control device 42 judges that the braking operation is input, this starts the braking control by the braking control unit 56. Thereafter, the control device 42 finishes this process.

Also, when the control device 42 judges that the hydraulic pressure is smaller than the threshold value B at the step S22, or that there is no tire of which wheel deceleration is not smaller than the threshold value b at the step S24, or that the number of tires of which wheel deceleration is not smaller than the threshold value c is smaller than three at the step S26, this judges that the braking operation is not input and puts the brake lamp 60 into the non-lighting state as the step S19. Also, when the control device 42 judges that the braking operation is not input, this finishes the braking control by the braking control unit 56. Thereafter, the control device 42 finishes this process.

Meanwhile, the control device 42 performs the process at the step S18 or the step S19 and when this finishes this process, the control device 42 performs again the process in the flow diagram illustrated in FIG. 4 from the step S12. That is to say, in this embodiment also, the control device 42 repeatedly executes the process illustrated in FIG. 4. Meanwhile, the control to switch from the lighting to the non-lighting and the like at the time of repetitive operation is executed as the process illustrated in FIG. 3.

Also in the process illustrated in FIG. 4, the effect similar to that of the process illustrated in FIG. 3 can be obtained by judging the presence of the input of the braking operation based on the wheel deceleration when the hydraulic failure occurs.

Also, the control device 42 (and the braking device 20 and the vehicle 10 provided with the same) can control the brake lamp 60 at higher accuracy by controlling the lighting/non-lighting of the brake lamp 60 based on the wheel deceleration in addition to the hydraulic pressure of the master cylinder 23 detected by the hydraulic sensor 40 also when the hydraulic failure does not occur as illustrated in FIG. 4. That is to say, also in a case in which the detected value of the hydraulic sensor 40 becomes larger than the threshold value in a state in which the hydraulic pressure of the master cylinder 23 changes and the braking operation is not input due to offset of the hydraulic sensor 40 and change in a using state and a using environment, it is possible to prevent the lighting of the brake lamp 60 because it is controlled also based on the wheel deceleration. Also, by controlling also based on the wheel deceleration in this manner, it is possible to inhibit erroneous detection of the braking operation also when the value of the threshold value B is set to be lower than the threshold value A of the process in FIG. 3 described above as the detected value of the hydraulic sensor 40. According to this, it becomes possible to set the threshold value of the hydraulic pressure to be lower and a time period from start of the input of the braking operation to a time at which the hydraulic pressure of the master cylinder 23 becomes larger than the threshold value can be made shorter, so that the input of the braking operation can be detected more rapidly.

Also, herein, the threshold value c is set to the value of the wheel deceleration larger than the threshold value b and by turning on the brake lamp 60 when larger wheel deceleration is detected when the hydraulic failure occurs, it is possible to ensure reliability to compensate inability to use the detected value of the hydraulic sensor 40. That is to say, the threshold value c in a case in which the hydraulic failure occurs can be set to a value with which it can be judged that the braking operation is more surely input, and the threshold value b in a case in which the hydraulic failure does not occur can be set to the wheel deceleration, which might be detected also when the braking operation is not input. Even when the threshold value b in a case in which the hydraulic failure does not occur is set to the wheel deceleration, which might be detected also when the braking operation is not input, occurrence of the erroneous detection can be inhibited since the detected value of the hydraulic sensor 40 is also used.

Meanwhile, although it is judged based on the criterion of whether there are three or more tires of which wheel deceleration is not smaller than the threshold value when the hydraulic failure occurs in the process illustrated in FIG. 3 and the process illustrated in FIG. 4, the criterion for judgment is not limited to this. The control device 42 may specify the hydraulic system in which the hydraulic failure occurs and the criterion may be whether there is at least one tire of which wheel deceleration is larger than the threshold value out of the tires connected to the hydraulic system in which the hydraulic failure occurs.

Hereinafter, another example of the controlling operation of the control device 42 is described in further detail with reference to FIG. 5. Herein, FIG. 5 is a flow diagram illustrating an example of the operation of the control device.

First, the control device 42 judges whether there is the hydraulic failure by the hydraulic failure judging unit 50 as the step S12. When the control device 42 judges that there is no hydraulic failure (No) at the step S12, this judges whether the hydraulic pressure detected by the hydraulic sensor 40 is not smaller than the threshold value A as the step S14. When the control device 42 judges that the hydraulic pressure is not smaller than the threshold value A (Yes) at the step S14, this shifts to the step S18. Also, when the control device 42 judges that the hydraulic pressure is smaller than the threshold value A (No) at the step S14, this shifts to the step S19.

Also, when the control device 42 judges that there is the hydraulic failure (Yes) at the step S12, this specifies a failed system in which the failure occurs (that is to say, a failed hydraulic system) as a step S32. Meanwhile, it is possible to specify the failed system by comparing the wheel deceleration of each hydraulic system. Although the device configuration becomes complicated, it is also possible to provide another sensor for specifying the failed system.

When the control device 42 specifies the failed system at the step S32, this judges whether there is one or more wheels of which wheel deceleration is not smaller than the threshold value a in the failed system as a step S34. Specifically, the control device 42 calculates the wheel deceleration of the tire (wheel) corresponding to the hydraulic braking unit connected to the failed system from the wheel speed detected by the each wheel speed sensor 41. Further, the control device 42 judges whether there is one or more tires of which wheel deceleration is not smaller than the threshold value a out of the calculated wheel deceleration of the tire of the failed system.

When the control device 42 judges that there is one or more tires of which wheel deceleration is not smaller than the threshold value a in the failed system (Yes) at the step S34, this shifts to the step S18. Also, when the control device 42 judges that the number of tires of which wheel deceleration is not smaller than the threshold value a is smaller than one in the failed system (No) at the step S34, that is to say, that the wheel deceleration of all the tires corresponding to the failed system is smaller than the threshold value a, this shifts to the step S19.

When the control device 42 judges that the hydraulic pressure is not smaller than the threshold value A at the step S14 or that there are one or more tires of which wheel deceleration is not smaller than the threshold value a in the failed system at the step S34, this judges that the braking operation is input and turns on the brake lamp 60 as the step S18. Also, when the control device 42 judges that the braking operation is input, this starts the braking control by the braking control unit 56. Thereafter, the control device 42 finishes this process.

Also, when the control device 42 judges that the hydraulic pressure is smaller than the threshold value A at the step S14 or that there is no tire of which wheel deceleration is not smaller than the threshold value a in the tires corresponding to the failed system at the step S34, this judges that the braking operation is not input and puts the brake lamp 60 into the non-lighting state as the step S19. Also, when the control device 42 judges that the braking operation is not input, this finishes the braking control by the braking control unit 56. Thereafter, the control device 42 finishes this process.

Meanwhile, the control device 42 performs the process at the step S18 or the step S19, and when this finishes this process, the control device 42 performs again the process in the flow diagram illustrated in FIG. 5 from the step S12. That is to say, the control device 42 repeatedly executes the process illustrated in FIG. 5. Meanwhile, the control to switch from the lighting to the non-lighting and the like at the time of repetitive operation is executed as the process illustrated in FIG. 3.

Also in the process illustrated in FIG. 5, the effect similar to that of the process illustrated in FIG. 3 can be obtained by judging the presence of the input of the braking operation based on the wheel deceleration when the hydraulic failure occurs.

When the hydraulic failure occurs, the control device 42 specifies the failed system and controls the lighting of the brake lamp 60 based on the wheel deceleration of the tire to which the hydraulic braking unit to which the hydraulic pressure is supplied by the specified failed system is connected. According to this, the lighting of the brake lamp 60 can be controlled based on the wheel deceleration of the tire, which further corresponds to the deceleration of the vehicle 10. Therefore, the lighting of the brake lamp 60 can be appropriately controlled also when relationship of the wheel deceleration between the tire connected to the hydraulic system in which the hydraulic failure occurs and the tire connected to the hydraulic system in which the hydraulic failure does not occur is not constant by a condition of a travel road surface and the like.

Meanwhile, although it is controlled only by the hydraulic pressure when there is no hydraulic failure in the process illustrated in FIG. 5, the process illustrated in FIG. 5 can be applied to the process in FIG. 4 in which the control is performed by the hydraulic pressure and the wheel deceleration also when there is no hydraulic failure.

Also, the control device 42 is not limited to judging based on the criterion of whether there are three or more tires of which wheel deceleration is not smaller than the threshold value when the hydraulic failure occurs as the process illustrated in FIG. 3 and the process illustrated in FIG. 4 and based on the criterion of whether there is at least one tire of which wheel deceleration is larger than the threshold value out of the tires connected to the hydraulic system in which the hydraulic failure occurs as the process illustrated in FIG. 5. The control device 42 may judge based on the criterion of whether there is the tire of which wheel deceleration is not smaller than the threshold value in each of the tires on which the braking force is allowed to act by the hydraulic braking units of the different hydraulic systems.

When the hydraulic failure occurs, in the control device 42, the criterion is whether there is the tire of which wheel deceleration is not smaller than the threshold value a in each of the tires on which the braking force is allowed to act by the hydraulic braking units of the different hydraulic systems, that is to say, whether there is one or more tires of which wheel deceleration is not smaller than the threshold value a in all groups, each of which including a plurality of tires on which the braking force is allowed to act by the hydraulic braking units of one hydraulic system. The control device 42 judges that the braking operation is input when there is one or more tires of which wheel deceleration is not smaller than the threshold value a in all the groups. In this embodiment, when there is one or more tires of which wheel deceleration is not smaller than the threshold value a out of the tires corresponding to the hydraulic braking units to which the hydraulic pressure is supplied by the first hydraulic pipeline 24 and when there is one or more tires of which wheel threshold value is not smaller than the threshold value a out of the tires corresponding to the hydraulic braking units to which the hydraulic pressure is supplied by the second hydraulic pipeline 26, it is judged that the braking operation is input.

In this manner, also by detecting whether there is the tire of which value is larger than the threshold value for each hydraulic system and by turning on the brake lamp when there is one or more tires of which value is larger than the threshold value in all the hydraulic systems, the effect similar to that of the processes illustrated in FIGS. 3 and 4 can be obtained.

Also, by performing the process for each hydraulic system in this manner, the control becomes possible also by detecting the wheel deceleration of one tire of each hydraulic system, so that the number of tires of which wheel deceleration is detected can be reduced. Also, since the number of wheels required for the control can be reduced, inability of execution of the judgment because not all measurement conditions are available can be inhibited. That is to say, although the detected values of the three tires out of the four tires are required in the processes illustrated in FIGS. 3 and 4, the control becomes possible with the detected values of the two tires of the different systems out of the four tires in the above-described embodiment, so that the lighting of the brake lamp can be smoothly executed.

Also, although the control device 42 (and the braking device 20 provided with the same) performs the process of the first mode when the hydraulic failure does not occur and performs the process of the second mode when the hydraulic failure occurs in the above-described embodiment, there is no limitation. The control device 42 may perform the process of the first mode when each unit normally functions and may perform the process of the second mode when each unit does not normally function, that is to say, when the trouble occurs. For example, the control device 42 judges whether the hydraulic sensor 40 normally operates by the sensor trouble judging unit 51 and may switch whether to perform the process of the first mode or to perform the process of the second mode based on the judgment result.

Hereinafter, a case in which it is judged whether the hydraulic sensor 40 normally operates by the sensor trouble judging unit 51 to control the lighting and non-lighting of the brake lamp 60 based on the judgment result is described with reference to FIG. 6. Herein, FIG. 6 is a flow diagram illustrating an example of the operation of the control device.

First, the control device 42 judges whether the trouble occurs in the hydraulic sensor 40 by the sensor trouble judging unit 51 as a step S50. When the control device 42 judges that the trouble does not occur (No), that is to say, the hydraulic sensor 40 normally operates at the step S50, this judges whether the hydraulic pressure detected by the hydraulic sensor 40 is not smaller than the threshold value A as the step S14. When the control device 42 judges that the hydraulic pressure is not smaller than the threshold value A (Yes) at the step S14, this shifts to the step S18. Also, when the control device 42 judges that the hydraulic pressure is smaller than the threshold value A (No) at the step S14, this shifts to the step S19.

Also, when the control device 42 judges that there is the sensor trouble (Yes) at the step S50, this judges whether there are three or more wheels of which wheel deceleration is not smaller than the threshold value a as the step S16. That is to say, when the control device 42 judges that there is the sensor trouble (Yes) at the step S50, this judges that the detected value by the hydraulic sensor 40 is in the state in which the normal detected result cannot be calculated and judges the presence of the braking operation based on the wheel speed detected by the each wheel speed sensor 41.

When the control device 42 judges that there are three or more tires of which wheel deceleration is not smaller than the threshold value a (Yes) at the step S16, this shifts to the step S18. Also, when the control device 42 judges that the number of tires of which wheel deceleration is not smaller than the threshold value a is smaller than three (No) at the step S16, this shifts to the step S19.

When the control device 42 judges that the hydraulic pressure is not smaller than the threshold value A at the step S14 or that there are three or more tires of which wheel deceleration is not smaller than the threshold value a at the step S16, this judges that the braking operation is input and turns on the brake lamp 60 as the step S18. Also, when the control device 42 judges that the braking operation is input, this starts the braking control by the braking control unit 56. Thereafter, the control device 42 finishes this process.

Also, when the control device 42 judges that the hydraulic pressure is smaller than the threshold value A at the step S14 or that the number of tires of which wheel deceleration is not smaller than the threshold value a is smaller than three at the step S16, this judges that the braking operation is not input and puts the brake lamp 60 into the non-lighting state as the step S19. Also, when the control device 42 judges that the braking operation is not input, this finishes the braking control by the braking control unit 56. Thereafter, the control device 42 finishes this process.

Meanwhile, the control device 42 performs the process at the step S18 or the step S19 and when this finishes this process, the control device 42 performs again the process in the flow diagram illustrated in FIG. 6 from the step S50. That is to say, the control device 42 repeatedly executes the process illustrated in FIG. 6.

In this manner, the control device 42 can switch the process of the first mode and the process of the second mode based on whether there is the trouble in the hydraulic sensor 40 by using the sensor trouble judging unit 51, thereby obtaining the effect similar to that of the process illustrated in FIG. 3 as described above in response to the state of the hydraulic sensor 40. That is to say, the control of the brake lamp 60 can be smoothly executed by controlling based on the wheel deceleration even when the trouble occurs in the hydraulic sensor 40 and the control of the brake lamp 60 based on the hydraulic pressure cannot be executed.

Figure 7:
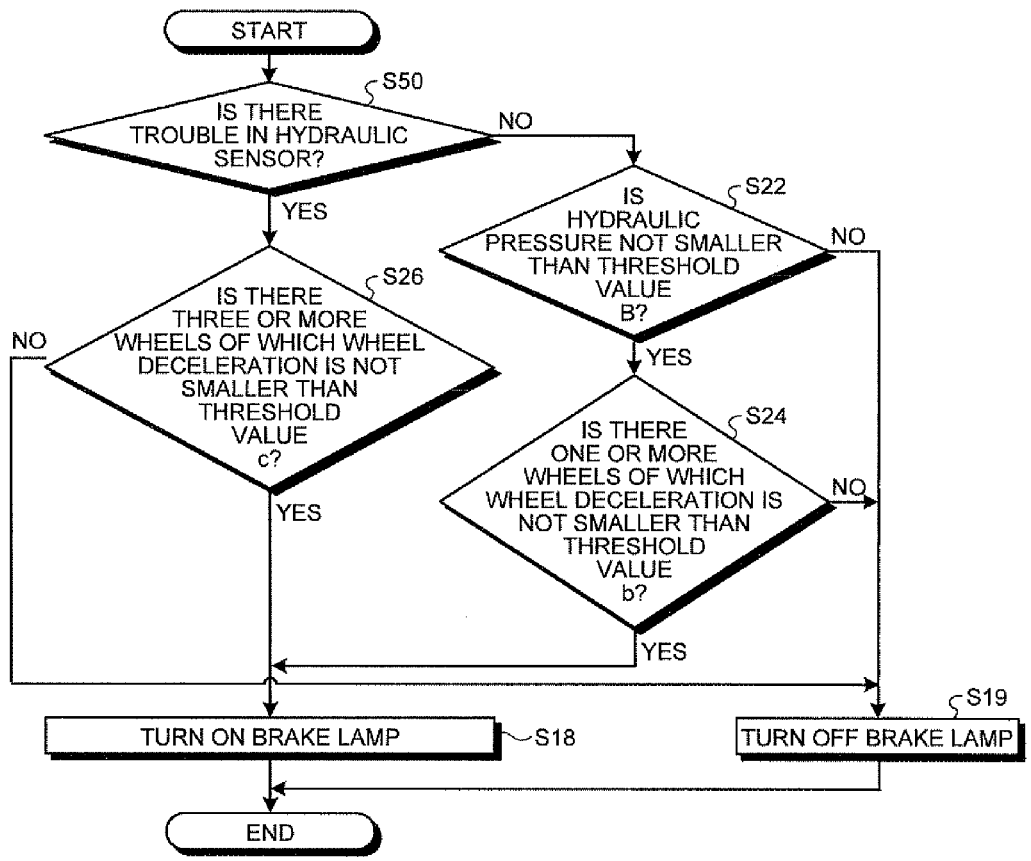
FIG. 7 is a flow diagram illustrating another example of the operation of the control device.

Next, another example of the controlling operation by the control device 42 is described with reference to FIG. 7. Herein, FIG. 7 is a flow diagram illustrating an example of the operation of the control device. The process illustrated in FIG. 7 is the process to change the condition of judging whether the braking operation is input based on the judgment result of the hydraulic failure judging unit 50.

First, the control device 42 judges whether the trouble occurs in the hydraulic sensor 40 by the sensor trouble judging unit 51 as the step S50. When the control device 42 judges that the trouble does not occur (No), that is to say, the hydraulic sensor 40 normally operates at the step S50, this judges whether the hydraulic pressure detected by the hydraulic sensor 40 is not smaller than the threshold value B as the step S22. When the control device 42 judges that the hydraulic pressure is not smaller than the threshold value B (Yes) at the step S22, this shifts to the step S24. Also, when the control device 42 judges that the hydraulic pressure is smaller than the threshold value B (No) at the step S22, this shifts to the step S19.

When the control device 42 judges that the hydraulic pressure is not smaller than the threshold value B at the step S22, this judges whether there is one or more tires of which wheel deceleration is not smaller than the threshold value b out of the wheel deceleration of each tire by the brake operation judging unit 52 as the step S24. When the control device 42 judges that there is one or more tires of which wheel deceleration is not smaller than the threshold value b (Yes) at the step S24, this shifts to the step S18. Also, when the control device 42 judges that the number of tires of which wheel deceleration is not smaller than the threshold value b is smaller than one (No) at the step S24, this shifts to the step S19. Meanwhile, the process at the steps S22 and S24 becomes the process of the first mode in this embodiment.

Also, when the control device 42 judges that there is the sensor trouble (Yes) at the step S50, this judges whether there are three or more wheels of which wheel deceleration is not smaller than the threshold value c as the step S26. Herein, the threshold value c is the value of the wheel deceleration larger than the threshold value b.

When the control device 42 judges that there are three or more tires of which wheel deceleration is not smaller than the threshold value c (Yes) at the step S26, this shifts to the step S18. Also, when the control device 42 judges that the number of tires of which wheel deceleration is not smaller than the threshold value c is smaller than three (No) at the step S26, this shifts to the step S19. Meanwhile, in this embodiment, the process at the step S26 becomes the process of the second mode.

When the control device 42 judges that the hydraulic pressure is not smaller than the threshold value B at the step S22 and that there is one or more tires of which wheel deceleration is not smaller than the threshold value b at the step S24 or that there are three or more tires of which wheel deceleration is not smaller than the threshold value c at the step S26, this judges that the braking operation is input and turns on the brake lamp 60 as the step S18. Also, when the control device 42 judges that the braking operation is input, this starts the braking control by the braking control unit 56. Thereafter, the control device 42 finishes this process.

Also, when the control device 42 judges that the hydraulic pressure is smaller than the threshold value B at the step S22, or that there is no tire of which wheel deceleration is not smaller than the threshold value b at the step S24, or that the number of tires of which wheel deceleration is not smaller than the threshold value c is smaller than three at the step S26, this judges that the braking operation is not input and puts the brake lamp 60 into the non-lighting state as the step S19. Also, when the control device 42 judges that the braking operation is not input, this finishes the braking control by the braking control unit 56. Thereafter, the control device 42 finishes this process.

Meanwhile, the control device 42 performs the process at the step S18 or the step S19 and when this finishes this process, the control device 42 performs again the process in the flow diagram illustrated in FIG. 7 from the step S50. That is to say, in this embodiment also, the control device 42 repeatedly executes the process illustrated in FIG. 7. Meanwhile, the control to switch from the lighting to the non-lighting and the like at the time of repetitive operation is executed as the process illustrated in FIG. 6.

When the sensor trouble occurs also in the process illustrated in FIG. 7, the effect similar to that of the process illustrated in FIG. 6 can be obtained by judging the presence of the input of the braking operation based on the wheel deceleration. Also, in the process illustrated in FIG. 7, also when the hydraulic failure does not occur, the brake lamp 60 can be controlled at higher accuracy as in the example illustrated in FIG. 4 by controlling the lighting/non-lighting of the brake lamp 60 also based on the wheel deceleration in addition to the hydraulic pressure of the master cylinder 23 detected by the hydraulic sensor 40.

Meanwhile, the control device 42 may execute only any one of the processes illustrated in FIG. 3 to FIG. 7 or can execute a plurality of processes. Meanwhile, the processes illustrated in FIG. 3 to FIG. 5 are the control corresponding to the time at which the hydraulic failure occurs and the processes illustrated in FIGS. 6 and 7 are the control corresponding to the presence of the trouble of the hydraulic sensor 40, so that operation to turn on/turn off the brake lamp 60 and the braking control can be smoothly executed by executing both of them. Meanwhile, when it is controlled by using the presence of occurrence of the hydraulic failure and the presence of the trouble of the hydraulic sensor 40, when the hydraulic failure does not occur and the trouble does not occur in the hydraulic sensor 40 (that is to say, when each unit normally operates), the process of the first mode is preferably executed and when any of the occurrence of the hydraulic failure and the occurrence of the trouble of the hydraulic sensor 40 is detected (when it is detected that at least a portion does not normally operate), the process of the second mode is preferably executed. According to this, safer control can be executed and the brake lamp can be appropriately turned on.

Although the hydraulic pressure is controlled in this embodiment because the hydraulic oil is used as fluid to operate the braking device, when another fluid is used, the similar control can be executed by the fluid pressure.

Also, the vehicle braking device and the control device of this embodiment can perform the above-described process by using the detected value of the hydraulic sensor required for the vehicle and generally provided for another application as described above. According to this, the sensor, which detects the depression amount of the brake pedal 21, is not necessary, so that the device configuration can be made simple and also the process similar to that when using the sensor, which detects the depression amount of the brake pedal 21, becomes possible. Meanwhile, the vehicle braking device and the control device of this embodiment can be used as a backup device of a case in which there is the breakdown in the sensor, which detects the depression amount of the brake pedal 21, also when being used in the vehicle provided with the sensor, which detects the depression amount of the brake pedal 21. When this is used as the backup device in this manner also, the process similar to that in the case in which the sensor, which detects the depression amount of the brake pedal 21, is used becomes possible and the braking control can be appropriately executed.

Although the first hydraulic pipeline 24 is the hydraulic system to supply the hydraulic pressure from the master cylinder 23 to the hydraulic braking unit $28_{rf}$ of the right front tire 14 and the hydraulic braking unit $28_{lr}$ of the left rear tire 16 and the second hydraulic pipeline 26 is the hydraulic system to supply the hydraulic pressure from the master cylinder 23 to the hydraulic braking unit $28_{lf}$ of the left front tire 12 and the hydraulic braking unit $28_{rr}$ of the right rear tire 18 in the above-described embodiment, connection relationship between the hydraulic pipeline and the hydraulic braking unit of each tire is not limited thereto. For example, it may be configured that one hydraulic system is connected to the two tires on a front side and one hydraulic system is connected to the two tires on a rear side.

INDUSTRIAL APPLICABILITY

As described above, the vehicle braking device and the control device according to the present invention are useful to be used in the control based on the braking operation of the travelling vehicle body.

REFERENCE SIGNS LIST

10 VEHICLE
11 VEHICLE BODY
20 BRAKING DEVICE
23 MASTER CYLINDER
24 FIRST HYDRAULIC PIPELINE
26 SECOND HYDRAULIC PIPELINE
27 BRAKE ACTUATOR
$28_{lf}$, $28_{rf}$, $28_{lr}$, $28_{rr}$ HYDRAULIC BRAKING UNIT
40 HYDRAULIC SENSOR
42 CONTROL DEVICE
$41_{lf}$, $41_{rf}$, $41_{lr}$, $41_{rr}$ WHEEL SPEED SENSOR
50 HYDRAULIC FAILURE JUDGING UNIT
51 SENSOR TROUBLE JUDGING UNIT
52 BRAKE OPERATION JUDGING UNIT
54 JUDGEMENT CONDITION STORAGE UNIT
56 BRAKING CONTROL UNIT
58 DRIVING CONTROL UNIT

The invention claimed is:

1. A vehicle braking device that applies braking force to a tire rotatably arranged on a vehicle body, comprising:
a fluid pressure braking unit that allows the braking force to act on the tire;
a master cylinder that supplies a fluid pressure to the fluid pressure braking unit;
a fluid pressure pipeline unit that transmits the fluid pressure supplied from the master cylinder to the fluid pressure braking unit;
a pressure detecting sensor that detects a pressure of the fluid pressure supplied from the master cylinder to the fluid pressure braking unit;
a wheel speed detecting sensor that detects a wheel speed of the tire; and
a control device provided with a sensor trouble judging unit that judges whether the pressure detecting sensor normally detects the pressure, a braking operation judging unit that judges a state of braking operation, and a control unit that controls operation based on a judgment result of the braking operation judging unit, wherein
the braking operation judging unit judges that the braking operation is input when the fluid pressure detected by the pressure detecting sensor is not smaller than a threshold value set in advance in a process of a first mode in which the sensor trouble judging unit judges that the pressure detecting sensor normally detects the pressure, and judges that the braking operation is input when judging that wheel deceleration of the tire detected by the wheel speed detecting sensor is larger than a threshold value in a process of a second mode in which the sensor trouble judging unit judges that the pressure detecting sensor does not normally detect the pressure, and
the control unit puts a brake lamp arranged on the vehicle body into a lighting state from a non-lighting state when it is judged that the braking operation is input.

2. The vehicle braking device according to claim 1, wherein the control device further includes a fluid pressure failure judging unit that judges whether there is a failure in the fluid pressure supplied from the master cylinder to the fluid pressure braking unit, and
the braking operation judging unit executes the process of the first mode when the pressure detecting sensor normally detects the pressure and the fluid pressure failure does not occur, and executes the process of the second mode when it is judged that the pressure detecting sensor does not normally detect the pressure or when the fluid pressure failure judging unit judges that the failure occurs in the fluid pressure.

3. The vehicle braking device according to claim 2, wherein the fluid pressure pipeline unit includes at least two fluid pressure systems that transmit the fluid pressure from the master cylinder to the fluid pressure braking unit, and
the braking operation judging unit puts the brake lamp into the lighting state from the non-lighting state when judging that the wheel deceleration of two or more of tires on which the braking force is allowed to act by the fluid pressure braking unit to which the fluid pressure is transmitted by the fluid pressure systems different from each other is larger than the threshold value in the process of the second mode in which it is judged that the fluid pressure failure occurs.

4. The vehicle braking device according to claim 3, wherein the braking operation judging unit puts the brake lamp into the lighting state from the non-lighting state when the fluid pressure detected by the pressure detecting sensor is not smaller than a first threshold value set in advance and when judging that the wheel deceleration of the tire is not smaller than a second threshold value in the process of the first mode, and puts the brake lamp into the lighting state from the non-lighting state when judging that the wheel deceleration of the tire is not smaller than a third threshold value which is the wheel deceleration larger than the second threshold value in the process of the second mode.

5. The vehicle braking device according to claim 3, wherein, the braking operation judging unit puts the brake lamp into the lighting state from the non-lighting state when judging that there are three or more tires of which wheel deceleration is larger than the threshold value in the process of the second mode.

6. The vehicle braking device according to claim 2, wherein the fluid pressure pipeline unit includes at least two fluid pressure systems that transmit the fluid pressure from the master cylinder to the fluid pressure braking unit, and the braking operation judging unit puts the brake lamp into the lighting state from the non-lighting state when judging that the wheel deceleration of the tire on which the braking force is allowed to act by the fluid pressure braking unit to which the fluid pressure is transmitted by a fluid pressure system in which the failure occurs in the fluid pressure is larger than the threshold value in the process of the second mode in which it is judged that the fluid pressure failure occurs.

7. The vehicle braking device according to claim 6, wherein the braking operation judging unit puts the brake lamp into the lighting state from the non-lighting state when the fluid pressure detected by the pressure detecting sensor is not smaller than a first threshold value set in advance and when judging that the wheel deceleration of the tire is not smaller than a second threshold value in the process of the first mode, and puts the brake lamp into the lighting state from the non-lighting state when judging that the wheel deceleration of the tire is not smaller than a third threshold value which is the wheel deceleration larger than the second threshold value in the process of the second mode.

8. The vehicle braking device according to claim 6, wherein, the braking operation judging unit puts the brake lamp into the lighting state from the non-lighting state when judging that there are three or more tires of which wheel deceleration is larger than the threshold value in the process of the second mode.

9. The vehicle braking device according to claim 2, wherein the braking operation judging unit puts the brake lamp into the lighting state from the non-lighting state when the fluid pressure detected by the pressure detecting sensor is not smaller than a first threshold value set in advance and when judging that the wheel deceleration of the tire is not smaller than a second threshold value in the process of the first mode, and puts the brake lamp into the lighting state from the non-lighting state when judging that the wheel deceleration of the tire is not smaller than a third threshold value which is the wheel deceleration larger than the second threshold value in the process of the second mode.

10. The vehicle braking device according to claim 2, wherein, the braking operation judging unit puts the brake lamp into the lighting state from the non-lighting state when judging that there are three or more tires of which wheel deceleration is larger than the threshold value in the process of the second mode.

11. The vehicle braking device according to claim 1, wherein the braking operation judging unit puts the brake lamp into the lighting state from the non-lighting state when the fluid pressure detected by the pressure detecting sensor is not smaller than a first threshold value set in advance and when judging that the wheel deceleration of the tire is not smaller than a second threshold value in the process of the first mode, and puts the brake lamp into the lighting state from the non-lighting state when judging that the wheel deceleration of the tire is not smaller than a third threshold value which is the wheel deceleration larger than the second threshold value in the process of the second mode.

12. The vehicle braking device according to claim 11, wherein, the braking operation judging unit puts the brake lamp into the lighting state from the non-lighting state when judging that there are three or more tires of which wheel deceleration is larger than the threshold value in the process of the second mode.

13. The vehicle braking device according to claim 1, wherein, the braking operation judging unit puts the brake lamp into the lighting state from the non-lighting state when judging that there are three or more tires of which wheel deceleration is larger than the threshold value in the process of the second mode.

14. A vehicle braking device that applies braking force to a tire rotatably arranged on a vehicle body, comprising:

a fluid pressure braking unit that allows the braking force to act on the tire;

a master cylinder that supplies a fluid pressure to the fluid pressure braking unit;

a fluid pressure pipeline unit that transmits the fluid pressure supplied from the master cylinder to the fluid pressure braking unit;

a pressure detecting sensor that detects a pressure of the fluid pressure supplied from the master cylinder to the fluid pressure braking unit;

a wheel speed detecting sensor that detects a wheel speed of the tire; and a control device provided with a fluid pressure failure judging unit that judges whether there is a failure in the fluid pressure supplied from the master cylinder to the fluid pressure braking unit, a braking operation judging unit that judges a state of braking operation, and a control unit that controls operation based on a judgment result of the braking operation judging unit, wherein the braking operation judging unit judges that the braking operation is input when the fluid pressure detected by the pressure detecting sensor is not smaller than a threshold value set in advance in a process of a first mode in which the fluid pressure failure judging unit judges that the failure does not occur in the fluid pressure, and judges that the braking operation is input when judging that wheel deceleration of the tire detected by the wheel speed detecting sensor is larger than a threshold value in a process of a second mode in which the fluid pressure failure judging unit judges that the failure occurs in the fluid pressure, and the control unit puts a brake lamp arranged on the vehicle body into a lighting state from a non-lighting state when it is judged that the braking operation is input.

15. The vehicle braking device according to claim 14, wherein the fluid pressure pipeline unit includes at least two fluid pressure systems that transmit the fluid pressure from the master cylinder to the fluid pressure braking unit, and the braking operation judging unit puts the brake lamp into the lighting state from the non-lighting state when judging that the wheel deceleration of two or more of tires on which the braking force is allowed to act by the fluid pressure braking unit to which the fluid pressure is transmitted by the fluid pressure systems different from each other is larger than the threshold value in the process of the second mode in which it is judged that the fluid pressure failure occurs.

16. The vehicle braking device according to claim 14, wherein the fluid pressure pipeline unit includes at least two fluid pressure systems that transmit the fluid pressure from the master cylinder to the fluid pressure braking unit, and the braking operation judging unit puts the brake lamp into the lighting state from the non-lighting state when judging that the wheel deceleration of the tire on which the braking force is allowed to act by the fluid pressure braking unit to which the fluid pressure is transmitted by a fluid pressure system in which the failure occurs in the fluid pressure is larger than the threshold value in the process of the second mode in which it is judged that the fluid pressure failure occurs.

17. The vehicle braking device according to claim 14, wherein the braking operation judging unit puts the brake lamp into the lighting state from the non-lighting state when the fluid pressure detected by the pressure detecting sensor is not smaller than a first threshold value set in advance and when judging that the wheel deceleration of the tire is not smaller than a second threshold value in the process of the first mode, and puts the brake lamp into the lighting state from the non-lighting state when judging that the wheel deceleration of the tire is not smaller than a third threshold value which is the wheel deceleration larger than the second threshold value in the process of the second mode.

18. The vehicle braking device according to claim 14, wherein, the braking operation judging unit puts the brake lamp into the lighting state from the non-lighting state when judging that there are three or more tires of which wheel deceleration is larger than the threshold value in the process of the second mode.

19. A control device of a vehicle including a vehicle body, a brake lamp provided on the vehicle body, a tire rotatably arranged on the vehicle body, a fluid pressure braking unit that allows braking force to act on the tire, a master cylinder that supplies a fluid pressure to the fluid pressure braking unit, a fluid pressure pipeline unit that transmits the fluid pressure supplied from the master cylinder to the fluid pressure braking unit, a pressure detecting sensor that detects a pressure of the fluid pressure supplied from the master cylinder to the fluid pressure braking unit, and a wheel speed detecting sensor that detects a wheel speed of the tire, the control device that applies the braking force to the tire rotatably arranged on the vehicle body, comprising:
- a sensor trouble judging unit that judges whether the pressure detecting sensor normally detects the pressure;
- a braking operation judging unit that judges a state of braking operation; and
- a control unit that controls operation based on a judgment result of the braking operation judging unit, wherein
- the braking operation judging unit judges that the braking operation is input when the fluid pressure detected by the pressure detecting sensor is not smaller than a threshold value set in advance in a process of a first mode in which it is judged that the pressure detecting sensor normally detects the pressure, and judges that the braking operation is input when judging that wheel deceleration of the tire detected by the wheel speed detecting sensor is larger than a threshold value in a process of a second mode in which it is judged that the pressure detecting sensor does not normally detect the pressure, and
- the control unit puts the brake lamp into a lighting state from a non-lighting state when it is judged that the braking operation is input.

20. A control device of a vehicle including a vehicle body, a brake lamp provided on the vehicle body, a tire rotatably arranged on the vehicle body, a fluid pressure braking unit that allows braking force to act on the tire, a master cylinder that supplies a fluid pressure to the fluid pressure braking unit, a fluid pressure pipeline unit that transmits the fluid pressure supplied from the master cylinder to the fluid pressure braking unit, a pressure detecting sensor that detects a pressure of the fluid pressure supplied from the master cylinder to the fluid pressure braking unit, and a wheel speed detecting sensor that detects a wheel speed of the tire, the control device that applies the braking force to the tire rotatably arranged on the vehicle body, comprising:
- a fluid pressure failure judging unit that judges whether there is a failure in the fluid pressure supplied from the master cylinder to the fluid pressure braking unit;
- a braking operation judging unit that judges a state of braking operation; and
- a control unit that controls operation based on a judgment result of the braking operation judging unit, wherein
- the braking operation judging unit judges that the braking operation is input when the fluid pressure detected by the pressure detecting sensor is not smaller than a threshold value set in advance in a process of a first mode in which the fluid pressure failure judging unit judges that the failure does not occur in the fluid pressure, and judges that the braking operation is input when judging that wheel deceleration of the tire detected by the wheel speed detecting sensor is larger than a threshold value in a process of a second mode in which the fluid pressure failure judging unit judges that the failure occurs in the fluid pressure, and
- the control unit puts the brake lamp into a lighting state from a non-lighting state when it is judged that the braking operation is input.

* * * * *